US012126131B2

(12) United States Patent
Morello et al.

(10) Patent No.: US 12,126,131 B2
(45) **Date of Patent: *Oct. 22, 2024**

(54) ELECTRICAL CABLE TERMINAL WITH TWO PIECE COAXIAL CRIMPED OUTER FERRULE

(71) Applicant: Aptiv Technologies AG, Schaffhausen (CH)

(72) Inventors: John Morello, Warren, OH (US); James M. Rainey, Warren, OH (US); Luke Bucey, McDonald, OH (US)

(73) Assignee: Aptiv Technologies AG, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,975

(22) Filed: Oct. 13, 2023

(65) Prior Publication Data

US 2024/0039181 A1 Feb. 1, 2024

Related U.S. Application Data

(63) Continuation of application No. 17/668,839, filed on Feb. 10, 2022, now Pat. No. 11,824,319.

(51) Int. Cl.
*H01R 9/05* (2006.01)
*H01B 11/18* (2006.01)
(Continued)

(52) U.S. Cl.
CPC ....... *H01R 9/0518* (2013.01); *H01B 11/1808* (2013.01); *H01R 13/5804* (2013.01); *H01R 13/6592* (2013.01); *H01R 24/40* (2013.01)

(58) Field of Classification Search
CPC .............. H01R 9/0518; H01R 13/5804; H01R 13/6592; H01R 24/40; H01R 4/206;
(Continued)

(56) References Cited

U.S. PATENT DOCUMENTS 7,794,274 B2 9/2010 Phillips
8,366,483 B2 2/2013 Hardy et al.
(Continued)

FOREIGN PATENT DOCUMENTS

EP 1006613 A1 6/2000
EP 3091614 A1 11/2016
JP 2013033722 A 2/2013

OTHER PUBLICATIONS

"Extended European Search Report", European Patent Office, mailed on Jun. 22, 2023, 11 Pages.

*Primary Examiner* — Travis S Chambers
(74) *Attorney, Agent, or Firm* — Billion & Armitage

(57) ABSTRACT

A coaxial electrical cable assembly may include a central conductor disposed within a shield conductor of the coaxial cable. A coaxial electrical cable assembly may include a shield terminal having a tubular portion. The central conductor of the coaxial cable is disposed within the tubular portion and wherein the tubular portion is disposed within the shield conductor of the coaxial cable. A coaxial electrical cable assembly may include a first outer ferrule crimped around the shield conductor of the coaxial cable forming a first seam. A coaxial electrical cable assembly may include a second outer ferrule crimped around the first outer ferrule and forming a second seam. The first outer ferrule is arranged over the tubular portion of the shield terminal and the second outer ferrule is arranged over the first outer ferrule and an outer insulative jacket of the coaxial cable.

20 Claims, 8 Drawing Sheets

(51) Int. Cl.
*H01R 13/58* (2006.01)
*H01R 13/6592* (2011.01)
*H01R 24/40* (2011.01)

(58) Field of Classification Search
CPC ...... H01R 4/188; H01R 24/56; H01R 13/648; H01R 13/02; H01R 43/16; H01B 11/1808
See application file for complete search history.

(56) References Cited

U.S. PATENT DOCUMENTS

| | | | |
|---|---|---|---|
| 9,537,231 B2 | 1/2017 | Hall et al. | |
| 9,667,000 B1 | 5/2017 | Morello et al. | |
| 10,312,605 B2 | 6/2019 | Hamada et al. | |
| 10,516,238 B2 | 12/2019 | Lee et al. | |
| 10,741,975 B2 | 8/2020 | Jones et al. | |
| 10,770,840 B1 | 9/2020 | Garver et al. | |
| 11,824,319 B2 * | 11/2023 | Morello | H01B 11/1808 |
| 2012/0178289 A1 | 7/2012 | Holliday | |
| 2018/0026401 A1 | 1/2018 | Kanda et al. | |
| 2021/0280991 A1 | 9/2021 | De Cloet et al. | |

* cited by examiner

FIG. 10
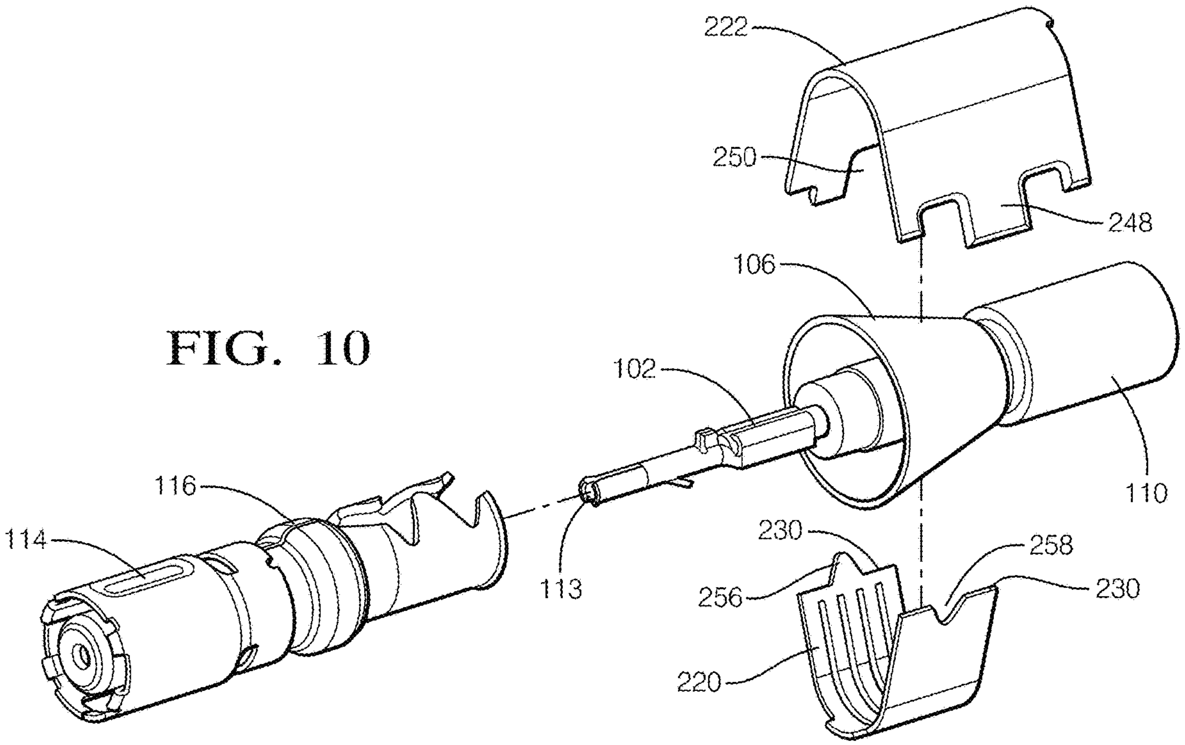
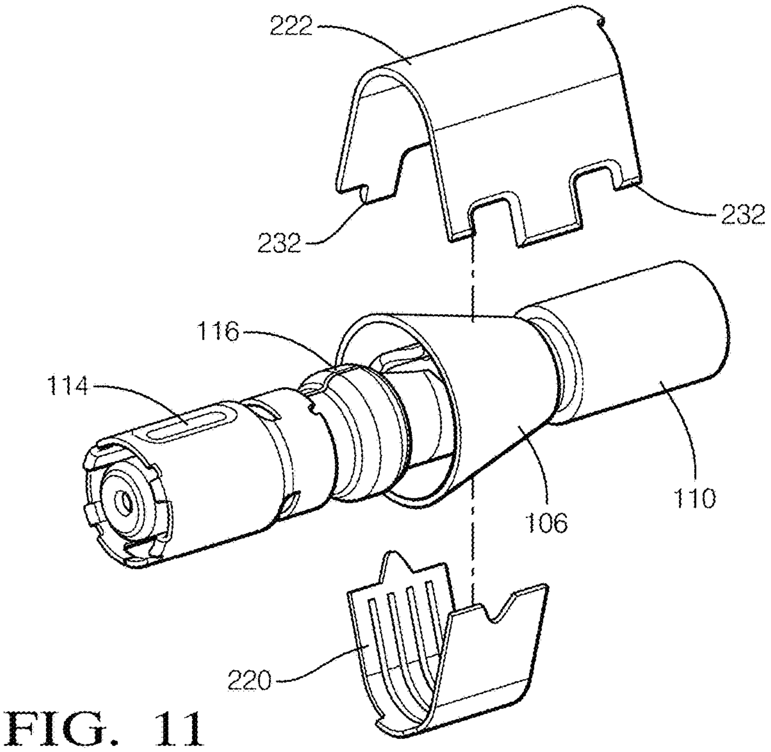
FIG. 11

ELECTRICAL CABLE TERMINAL WITH TWO PIECE COAXIAL CRIMPED OUTER FERRULE

CROSS-REFERENCE TO RELATED APPLICATION

This application is a continuation application that claims benefit of priority to U.S. patent application Ser. No. 17/668,839, titled "ELECTRICAL CABLE TERMINAL WITH TWO PIECE COAXIAL CRIMPED OUTER FERRULE" and filed on Feb. 10, 2022, the entire disclosure of which is hereby incorporated by reference.

TECHNICAL FIELD

This disclosure is directed to an electrical cable terminal with a two piece coaxial crimped outer ferrule.

BACKGROUND

Automotive electrical connectors are being required to meet new, more stringent, mechanical vibration requirements by automotive manufactures. In electrical connection systems used in motor vehicles, mechanical vibration can be transmitted to an electrical terminal via a wire cable attached to it. In coaxial connection systems, the amplitude of the vibration is too great of if the frequency of the vibration is at or near a resonant frequency of the terminal, the vibration can cause fretting corrosion or wear to the center contacts of the terminal that results in increased electrical resistance and degradation of the signal transmission through the connector.

SUMMARY

In some aspects, the techniques described herein relate to a coaxial electrical cable assembly, including: a central conductor disposed within a shield conductor of the coaxial cable; a shield terminal having a tubular portion, wherein the central conductor of the coaxial cable is disposed within the tubular portion and wherein the tubular portion is disposed within the shield conductor of the coaxial cable; a first outer ferrule crimped around the shield conductor of the coaxial cable forming a first seam; and a second outer ferrule crimped around the first outer ferrule and forming a second seam, wherein the first outer ferrule is arranged over the tubular portion of the shield terminal and the second outer ferrule is arranged over the first outer ferrule and an outer insulative jacket of the coaxial cable.

In some aspects, the techniques described herein relate to a method of assembling a coaxial electrical cable assembly, including: disposing a central conductor of a coaxial cable within a tubular portion of a shield terminal; disposing the tubular portion within a shield conductor of the coaxial cable; crimping a first outer ferrule having a first seam around the shield conductor, wherein the first outer ferrule is arranged over the tubular portion of the shield terminal; and crimping a second outer ferrule having a second seam around the first outer ferrule, wherein the second outer ferrule is arranged over the first outer ferrule and an outer insulative jacket of the coaxial cable.

In some aspects, the techniques described herein relate to a coaxial electrical cable assembly, including: a central conductor disposed within a shield conductor of the coaxial cable; a shield terminal having a tubular portion, wherein the central conductor of the coaxial cable is disposed within the tubular portion and wherein the tubular portion is disposed within the shield conductor of the coaxial cable; a first outer ferrule crimped around the shield conductor of the coaxial cable forming a first seam; and a second outer ferrule crimped around the first outer ferrule and forming a second seam, wherein an outer surface of the first outer ferrule defines a knurled pattern.

BRIEF DESCRIPTION OF THE DRAWINGS

The present invention will now be described, by way of example with reference to the accompanying drawings, in which:

FIG. 10 is an exploded view of the coaxial electrical cable assembly of FIG. 9 according to some embodiments.

FIG. 11 illustrates an assembly step in the process of assembling the coaxial electrical cable assembly of FIG. 9 according to some embodiments.

Similar elements in the various illustrated embodiments share the last two digits of the reference numbers.

DETAILED DESCRIPTION

A non-limiting example of a coaxial electrical cable assembly 100 and a method for producing such an assembly is presented herein.

Figure 1:
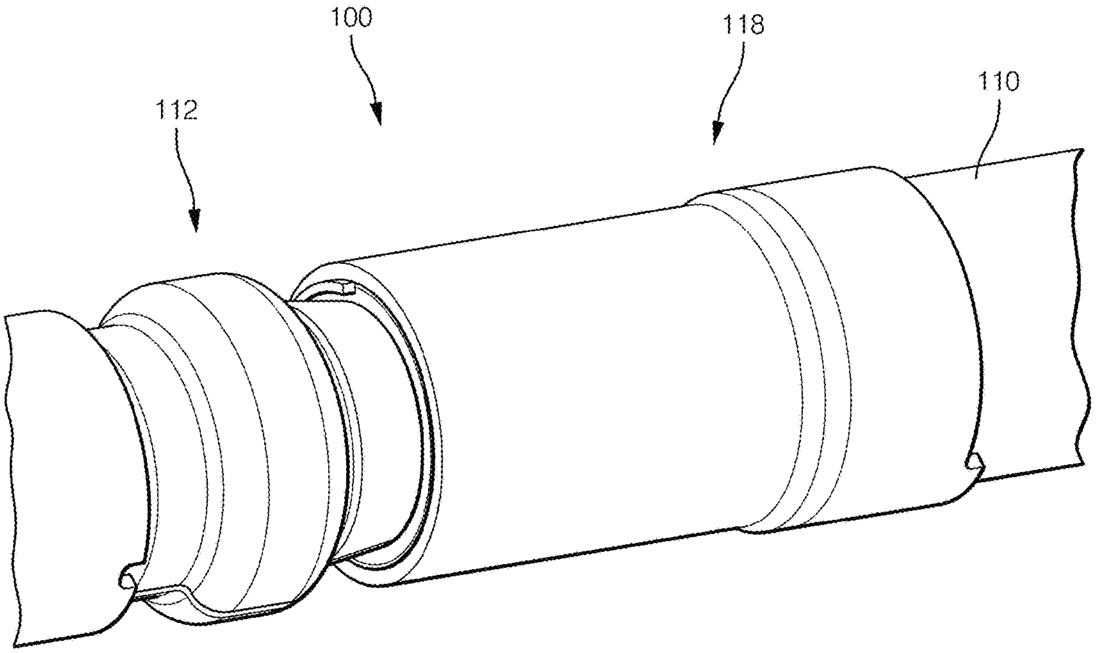
FIG. 1 is a perspective view of a coaxial electrical cable assembly including a two-piece crimped outer ferrule according to some embodiments.
Figure 2:
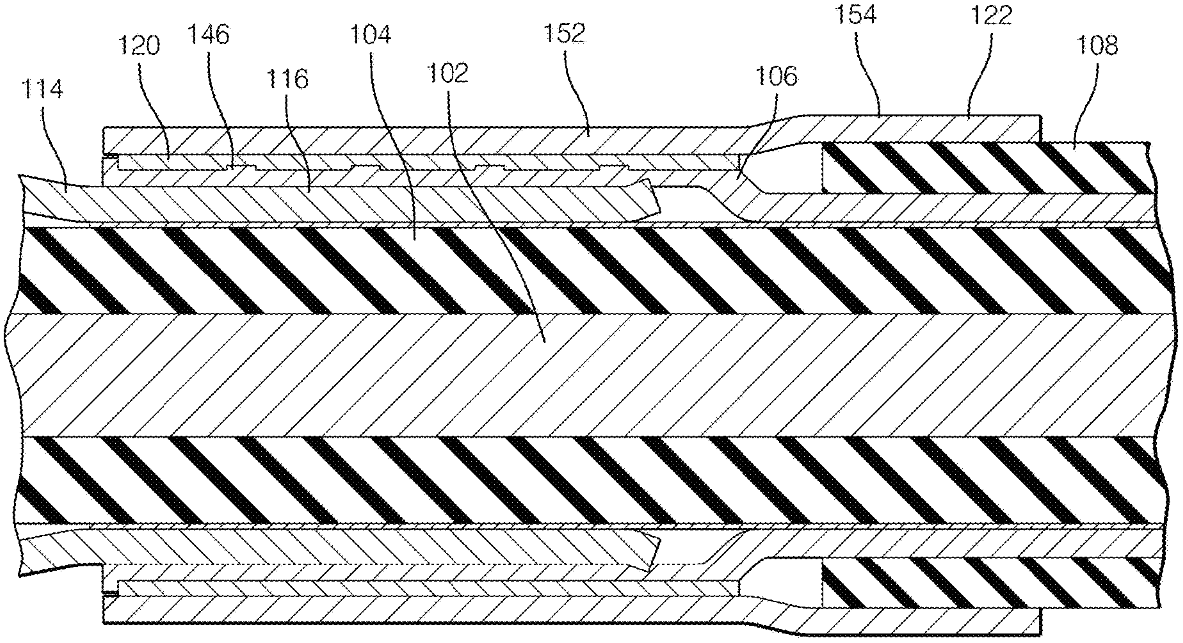
FIG. 2 is a cross-section view of the coaxial electrical cable assembly of FIG. 1 according to some embodiments.

As illustrated in FIGS. 1 and 2, The coaxial electrical cable assembly includes a central conductor 102, an inner insulation layer 104 around the central conductor 102, a shield conductor 106 formed of braided wire or foil surrounding the inner insulation layer 104, and an outer insulative jacket 108 surrounding the shield conductor 106 of the coaxial cable 110. An end of the coaxial cable 110 is terminated by a coaxial cable terminal 112 having a central terminal 113 attached to the central conductor 102 of the coaxial cable 110 and a shield terminal 114 surrounding the central terminal 113 and connected to the shield conductor 106 of the coaxial cable 110.

A tubular end portion 116 of the shield terminal 114 is disposed between the inner insulation layer 104 and the shield conductor 106 of the coaxial cable 110 and serves as an inner ferrule. The shield terminal 114 is mechanically and electrically connected to the shield conductor 106 of the coaxial cable 110 by a two-piece crimped outer ferrule 118. The two-piece crimped outer ferrule 118 includes an inner portion, hereafter referred to as the first outer ferrule 120, and an outer portion, hereafter referred to as the second outer ferrule 122. The first and second outer ferrules 120, 122 are formed from flat sheet metal, e.g., by a stamping, blanking, or cutting process, and may be attached to a carrier strip 128 as formed to facilitate automated handling of the first and second outer ferrules 120, 122, see FIGS. 3A, 3B, 4A, and 4B. This flat form of the first and second outer ferrules 120, 122 is herein referred to as a first and second outer ferrule preforms 124, 126. In the illustrated example, the shape of the first outer ferrule preform 124 is different than the shape of the second outer ferrule preform 126. The first and second outer ferrule preforms 124, 126 may also be formed of different materials. For example, the first preform may be formed of a stainless steel alloy and the second preform may be formed of a beryllium-copper alloy. The first and second outer ferrule preforms 124, 126 are each formed into the first and second outer ferrules 120, 122 by bending them into a shape that may be described as arcuate, V-shaped, or U-shaped as shown in FIG. 5.

Figure 5:
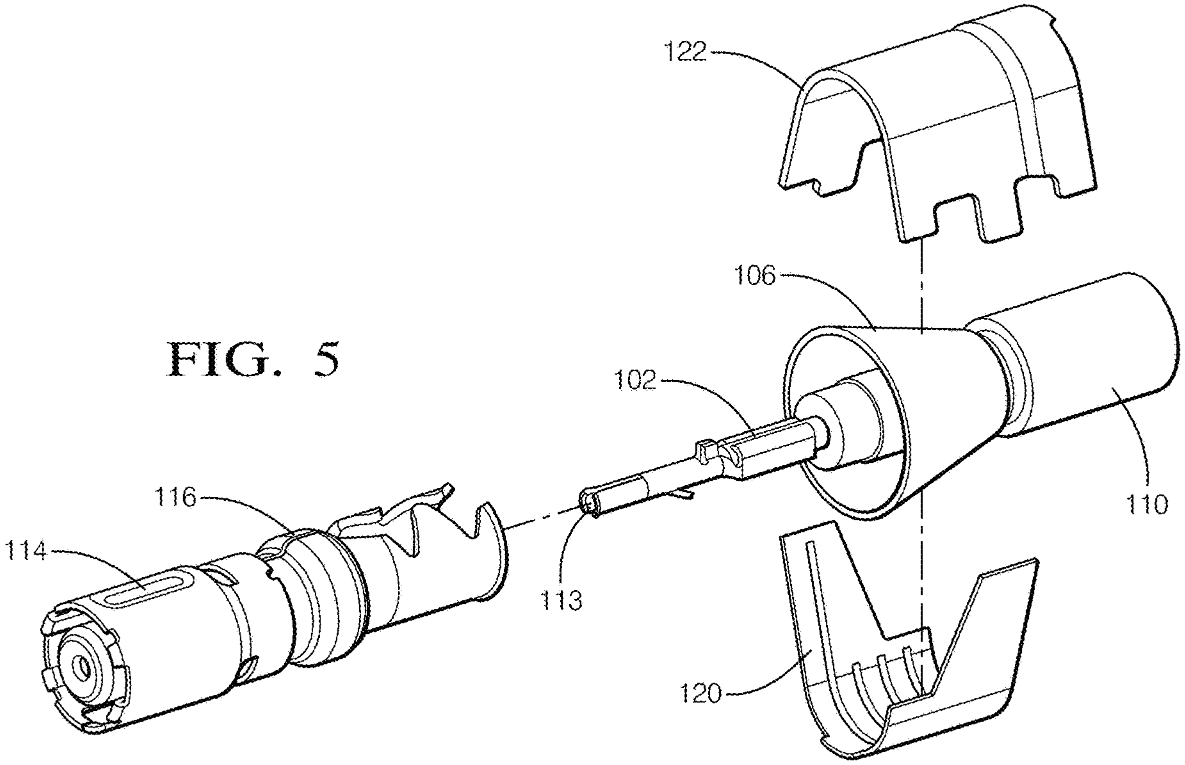
FIG. 5 is an exploded view of the coaxial electrical cable assembly of FIG. 1 according to some embodiments.
Figure 6:
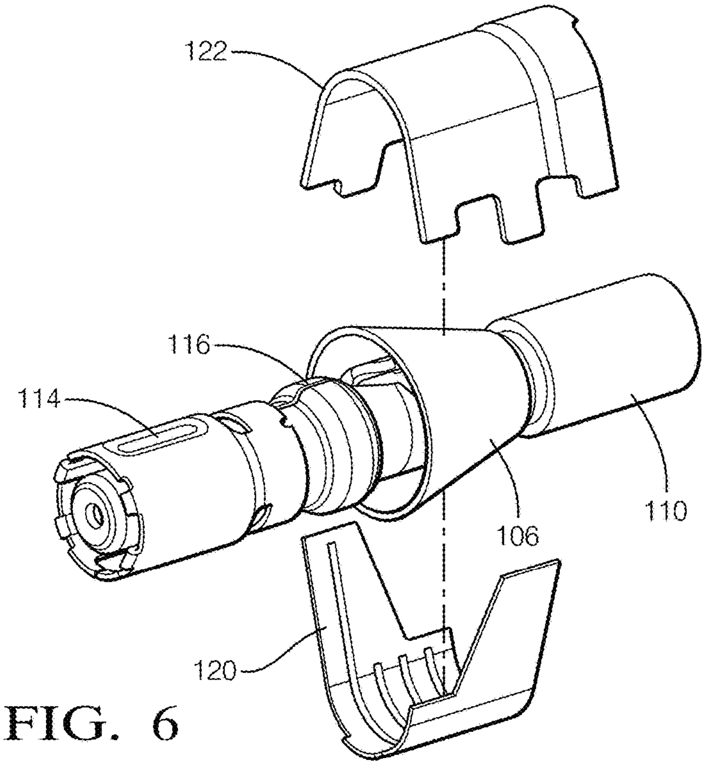
FIG. 6 illustrates an assembly step in the process of assembling the coaxial electrical cable assembly of FIG. 1 according to some embodiments.
Figure 7:
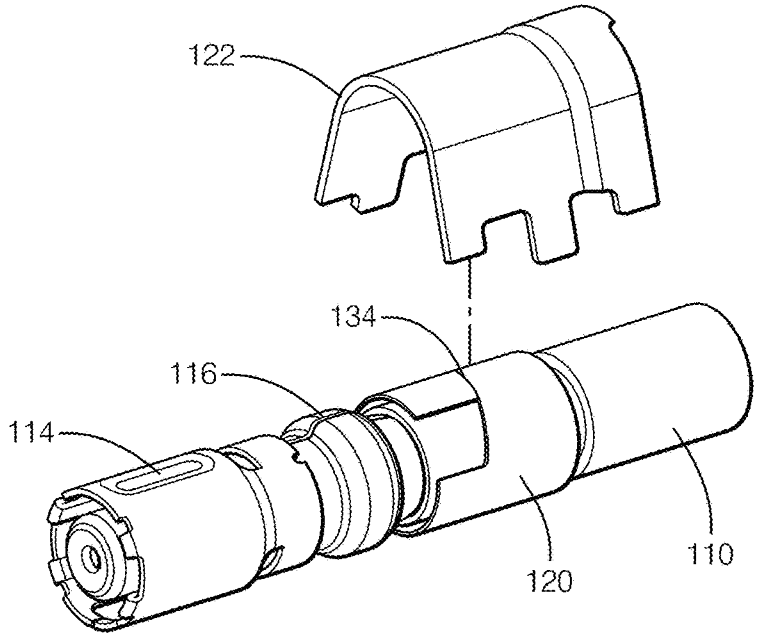
FIG. 7 illustrates another assembly step in the process of assembling the coaxial electrical cable assembly of FIG. 1 according to some embodiments.
Figure 8:
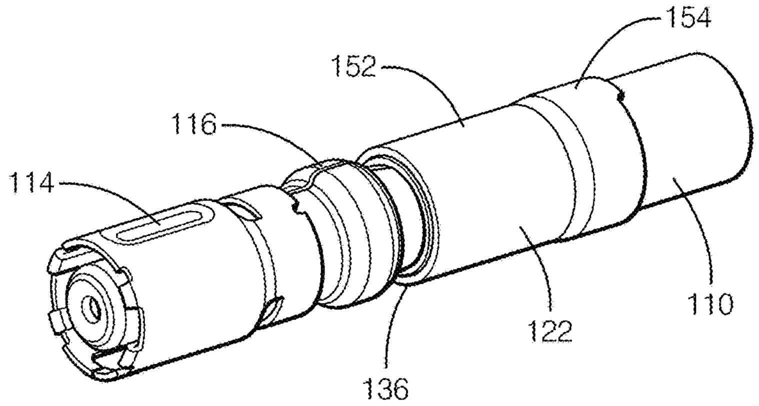
FIG. 8 illustrates the assembled two-piece outer ferrule of the coaxial electrical cable assembly of FIG. 1 according to some embodiments.
Figure 9:
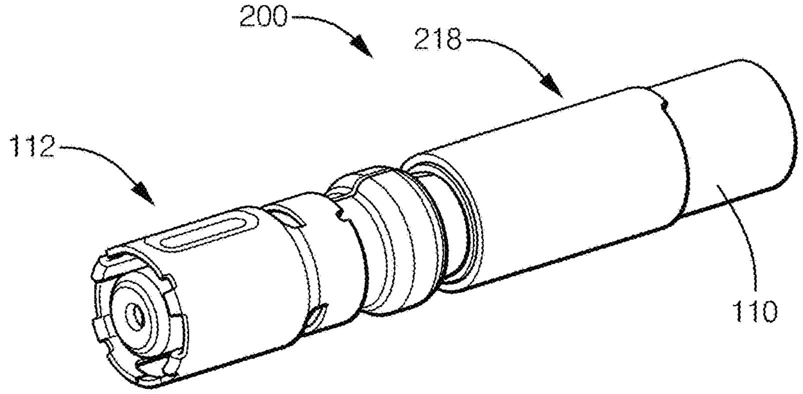
FIG. 9 is a perspective view of a coaxial electrical cable assembly including a two-piece crimped outer ferrule according to some embodiments.
Figure 12:
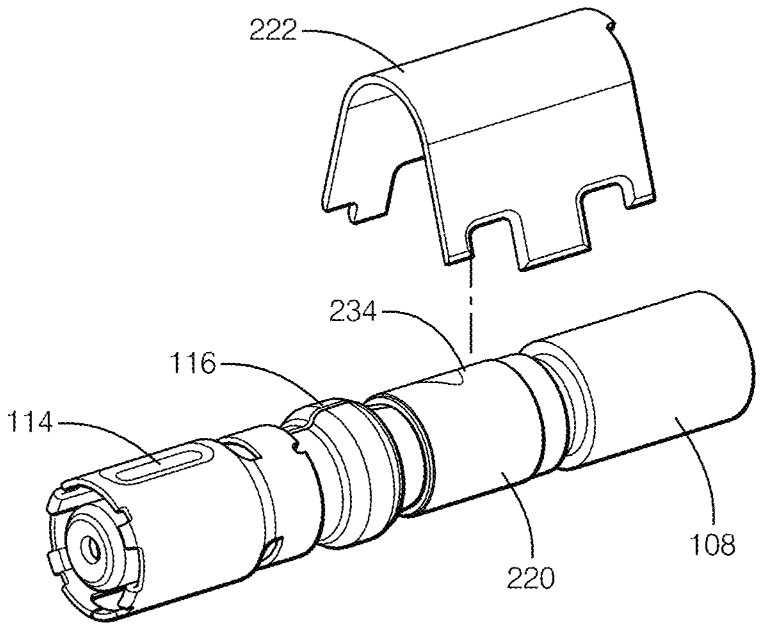
FIG. 12 illustrates another assembly step in the process of assembling the coaxial electrical cable assembly of FIG. 9 according to some embodiments.
Figure 13:
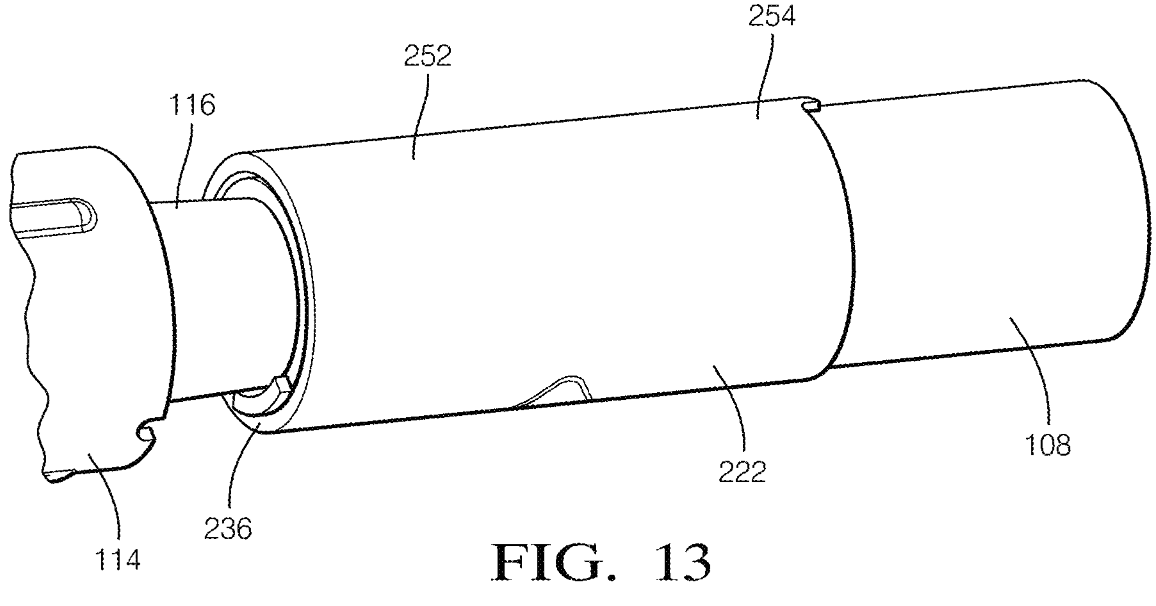
FIG. 13 illustrates the assembled two-piece outer ferrule of the coaxial electrical cable assembly of FIG. 9 according to some embodiments.

Prior to attachment to the shield terminal 114, the open ends of the first and second outer ferrules 120, 122 are arranged opposite each other as shown in FIGS. 5 and 6. The first outer ferrule 120 is crimped to the shield conductor 106 of the coaxial cable 110 by bringing the edges 130A, 130B, 130C of the first outer ferrule 120 together as it overlays the tubular end portion 116 of the shield conductor 106, thereby attaching the shield conductor 106 to the shield terminal 114 as illustrated in FIG. 7. The second outer ferrule 122 is then crimped over the first outer ferrule 120 by bringing the longitudinal edges 132 of the second outer ferrule 122 together as shown in FIG. 8, thereby reinforcing the first outer ferrule 120 and providing a strong and durable electrical and mechanical attachment between the shield conductor 106 and the shield terminal 114. The carrier strips 128 may be removed from the first and second outer ferrules 120, 122 prior to or after crimping of the first and second outer ferrules 120, 122.

Due to the arrangement of the first and second outer ferrules 120, 122 prior to crimping, the edges 130A, 130B, 130C, 132 of the first and second outer ferrules 120, 122 form first and second seams 134, 136 where the centers of the seams 134, 136 are radially offset from each other, preferably by about 90 to 270 degrees. As used herein "about X degrees" means X±10 degrees. The inventors have found that the hoop strength of the two-piece crimped outer ferrule 118 is diminished when there is little to no radial offset between the first and second seams 134, 136 of the first and second outer ferrules 120, 122 and thus negates at least one of the benefits of using the two-piece crimped outer ferrule 118.

Figure 3A:
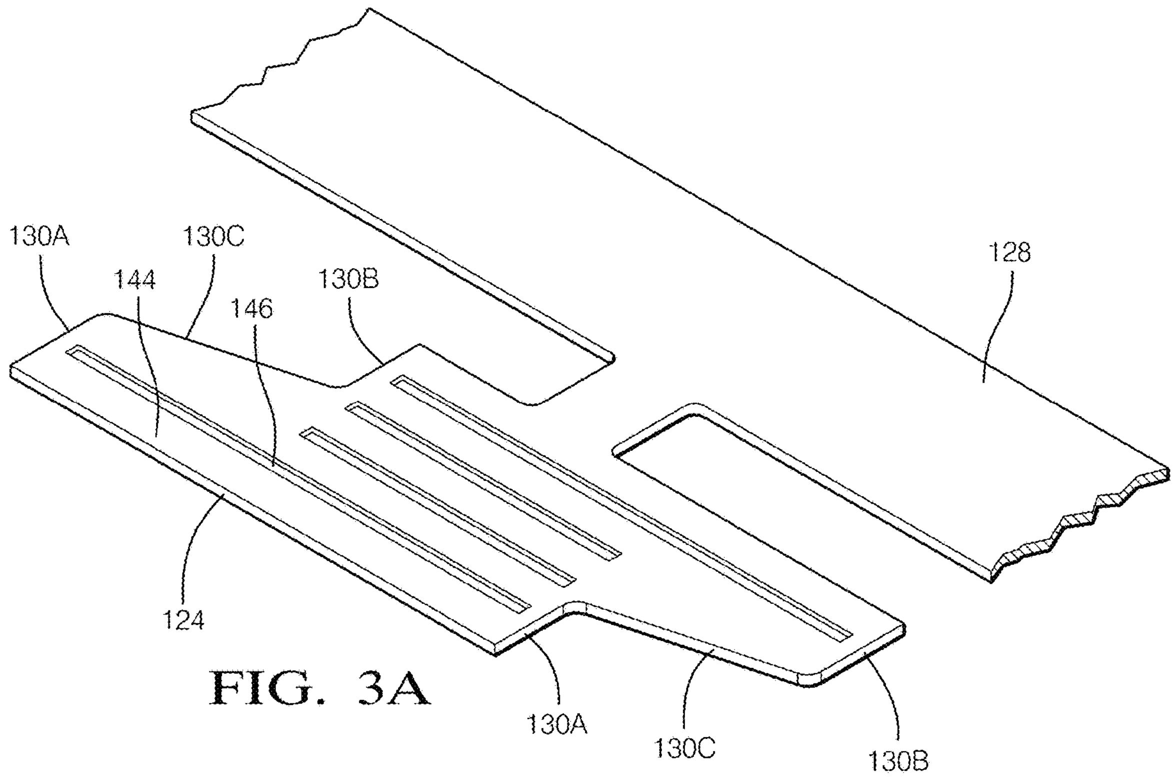
FIG. 3A is a perspective view of an inner surface of a preform used to form a first portion of a two-piece crimped outer ferrule according to some embodiments.
Figure 3B:
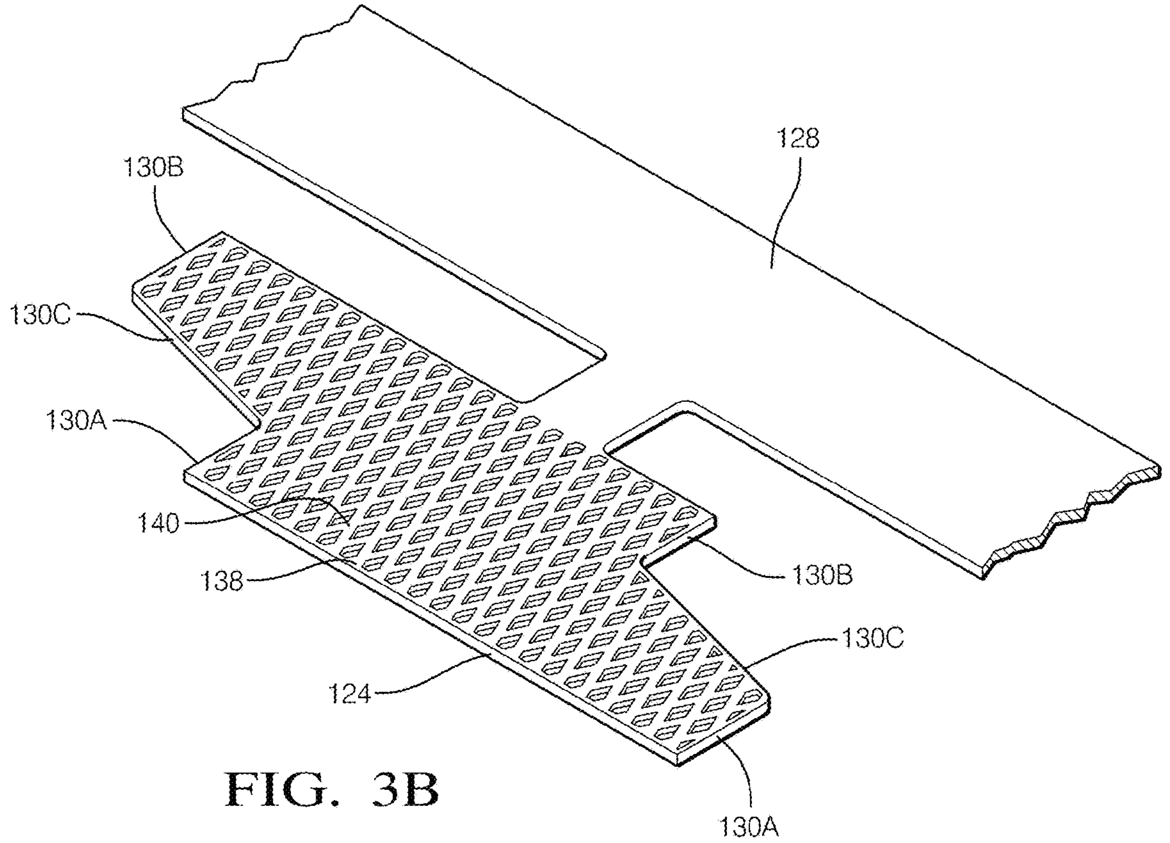
FIG. 3B is a perspective view of an outer surface of the preform used to form the first portion of the two-piece crimped outer ferrule shown in FIG. 3A according to some embodiments.
Figure 4A:
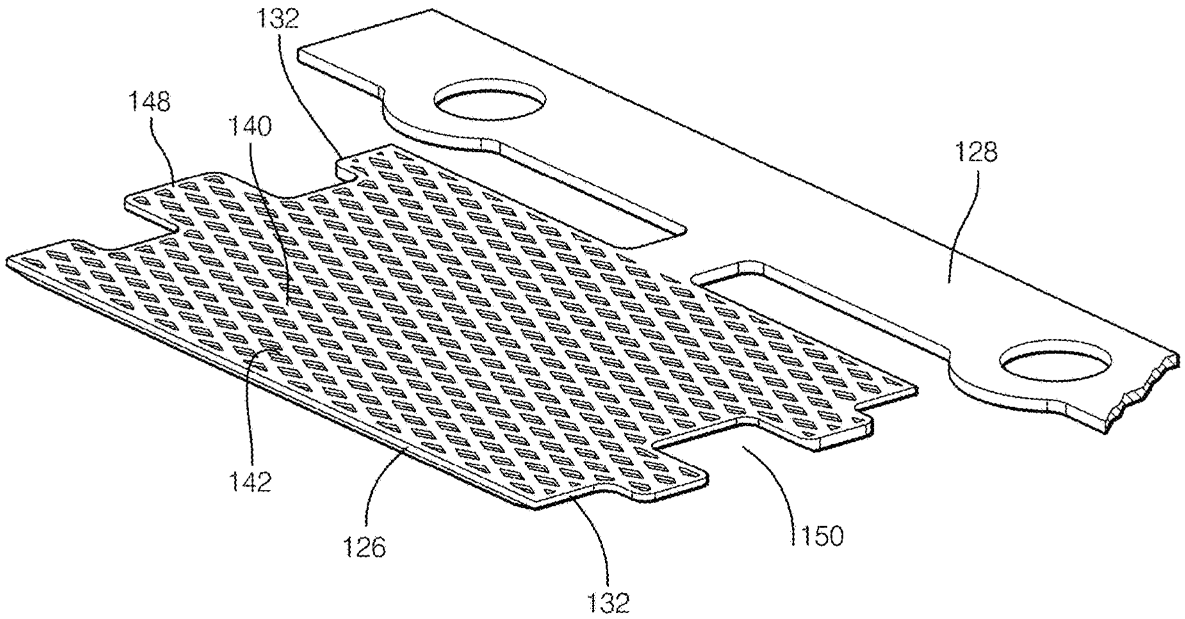
FIG. 4A is a perspective view of an inner surface of a preform used to form a second portion of the two-piece crimped outer ferrule according to some embodiments.
Figure 4B:
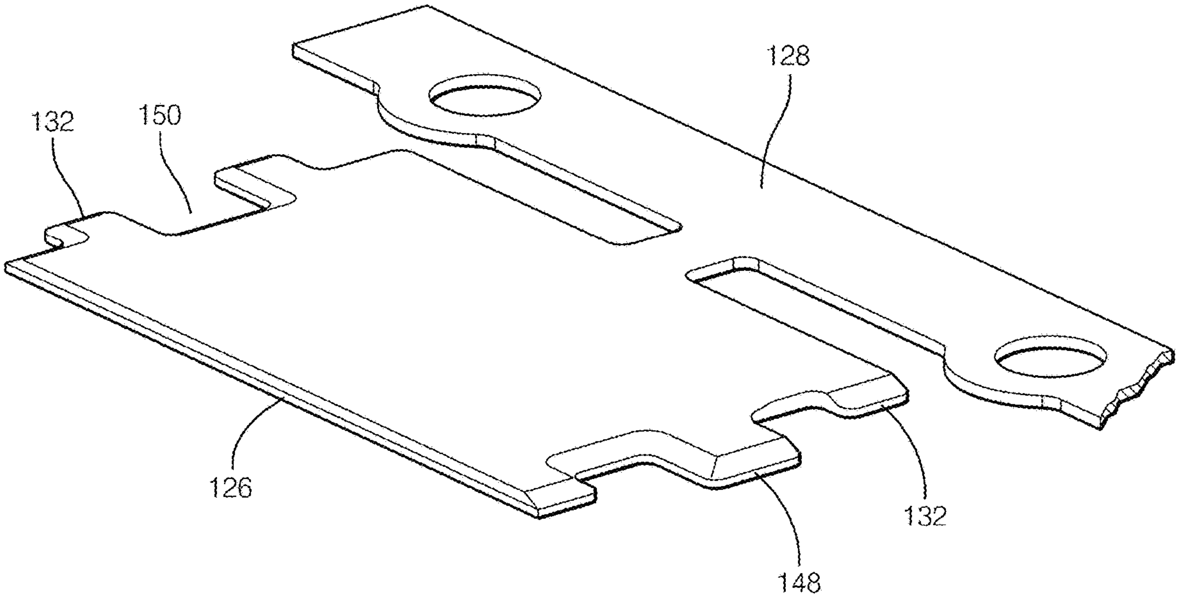
FIG. 4B is a perspective view of an outer surface of the preform used to form the second portion of the two-piece crimped outer ferrule shown in FIG. 4A according to some embodiments.

As shown in FIG. 3B, the outer surface 138 of the first outer ferrule 120 has a knurled pattern 140 impressed on it as does the inner surface 142 of the second outer ferrule 122 shown in FIG. 4A. In the illustrated examples, the knurling in the knurled pattern 140 has a rhombic shape, i.e., is in the shape of a rhombus. The knurled pattern 140 on the outer surface 138 of the first outer ferrule 120 and the inner surface 142 of the second outer ferrule 122 provides the benefit of increasing the coefficient of friction between the first and second outer ferrules 120, 122 which reduces the likelihood of movement of the second outer ferrule 122 relative to the first outer ferrule 120 which may degrade the electrical and/or mechanical connection between the shield terminal 114 and the shield conductor 106. The knurled patterns 140 are also configured to improve the electrical connection between the first and second outer ferrules 120, 122 by providing a plurality of contact points therebetween.

As illustrated in FIGS. 2 and 3A, the inner surface 144 of the first outer ferrule 120 defines a plurality of lateral grooves 146. As used herein, the term "lateral grooves" means that the major axis of the grooves are aligned generally perpendicularly, i.e., ±10 degrees from perpendicular, to the seam 134. These lateral grooves 146 are configured to improve the electrical connection between the first outer ferrule 120 and the shield conductor 106. These lateral grooves 146 are also configured to increase the pull off force required to separate the first outer ferrule 120 from the coaxial cable 110 once the first outer ferrule 120 is crimped to the shield conductor 106.

The edges of the first outer ferrule 120 have first edge portions 130A longitudinally extending from an end of the first outer ferrule 120, second edge portions 130B longitudinally extending from an opposite end of the first outer ferrule 120 and radially offset from the first edge portions 130A, and third edge portions 130C extending diagonally across the first outer ferrule 120 from an interior end of the first edge portions 130A to an interior end of the second edge portions 130B. These three edge portions 130A, 130B, 130C form wings that overlap and wrap around the shield conductor 106. Other embodiments may be envisioned in which the edge portions of the first outer ferrule have other shapes forming the wings.

These wings are configured to capture any stray strands of the shield conductor 106 when the first outer ferrule 120 is crimped. Different seam shapes, such as a straight longitudinal seam, may allow stray strands of the shield conductor 106 to protrude through and fill the seam since the first seam may form a gap due to spring back of the first outer ferrule after it is crimped. These stray strands would not be compacted when the second outer ferrule 122 is crimped over the first outer ferrule and would prevent the first outer ferrule from reaching it's designed diameter when the second outer ferrule 122 is crimped over it, thus reducing the retention force applied by a two-piece crimped outer ferrule on the shield conductor 106.

One longitudinal edge 132 of the second outer ferrule 122 defines a rectangular tab 148 extending therefrom and the other longitudinal edge 132 of the second outer ferrule 122 defines a corresponding rectangular notch 150. When the second outer ferrule 122 is crimped, the rectangular tab 148 is disposed within the rectangular notch 150, thereby providing an alignment feature for the seam 136 of the second outer ferrule 122. While the illustrated example has rectangular tabs 148 and notches 150 in the second outer ferrule edges 132, alternative embodiments may be envisioned having other shapes for the tabs and notches, e.g., square, semicircular, etc. Additionally, yet other embodiments may also be envisioned in which the edge portions of the first outer ferrule and the tabs and notches of the second outer ferrule have the same shape.

As best illustrated in FIG. 2, the first outer ferrule 120 is arranged so that it overlies the tubular end portion 116 of the shield terminal 114 when it is crimped. The tubular end portion 116 defines a seam and the first outer ferrule 120 is preferably arranged so that the first seam 134 of the first outer ferrule 120 overlies the seam in the tubular end portion 116. The second outer ferrule 122 is arranged so that it overlies the first outer ferrule 120 and the outer insulative jacket 108 of the coaxial cable 110 and preferably so that the second seam 136 is radially offset from the first seam 134 of the first outer ferrule 120 by about 90 to 270 degrees.

As best shown in FIGS. 2 and 8, a first portion 152 of the second outer ferrule 122 that is arranged over the first outer ferrule 120 has a smaller diameter than a second portion 154 of the second outer ferrule 122 that is arranged over the outer insulative jacket 108 of the coaxial cable 110.

In an alternative embodiment of the coaxial electrical cable assembly 200 illustrated in FIGS. 9-13, the outer ferrule has a first inner ferrule 220 having a longitudinal first seam 234 with one longitudinal edge 230 of the first outer ferrule 220 that defines a triangular tab 256 extending therefrom and the other longitudinal edge 230 of the first outer ferrule 220 defining a corresponding triangular notch 258. When the first outer ferrule 220 is crimped, the triangular tab 256 is disposed within the triangular notch 258, thereby providing an alignment feature for the longitudinal seam 234 of the first outer ferrule 220. While the illustrated example has triangular tabs 256 and notches 258 in the first outer ferrule edges 232 and rectangular tabs 248 and notches 250 in the second outer ferrule edges 232, alternative embodiments may be envisioned having other shapes for the tabs and notches, e.g., square, semicircular, etc. Additionally, yet other embodiments may also be envisioned in which the edge portions of the first outer ferrule and the tabs and notches of the second outer ferrule have the same shape.

The edges 230, 232 of the first and second outer ferrules 220, 222 of the coaxial electrical cable assembly 200 form first and second seams 234, 236. Due to the arrangement of the first and second outer ferrules 220, 222 prior to crimping, the centers of the seams 234, 236 are radially offset from each other, preferably by about 180 degrees. The inventors have found that the hoop strength of the two-piece crimped outer ferrule 218 is diminished when there is little to no radial offset between the first and second seams 234, 236 of the first and second outer ferrules 220, 222 and thus negates at least one of the benefits of using the two-piece crimped outer ferrule 218.

In addition, a first portion 252 of the second outer ferrule 222 that is arranged over the first outer ferrule 220 has the same diameter as a second portion 254 of the second outer ferrule 222 that is arranged over the outer insulative jacket 108 of the coaxial cable 110.

Figure 14:
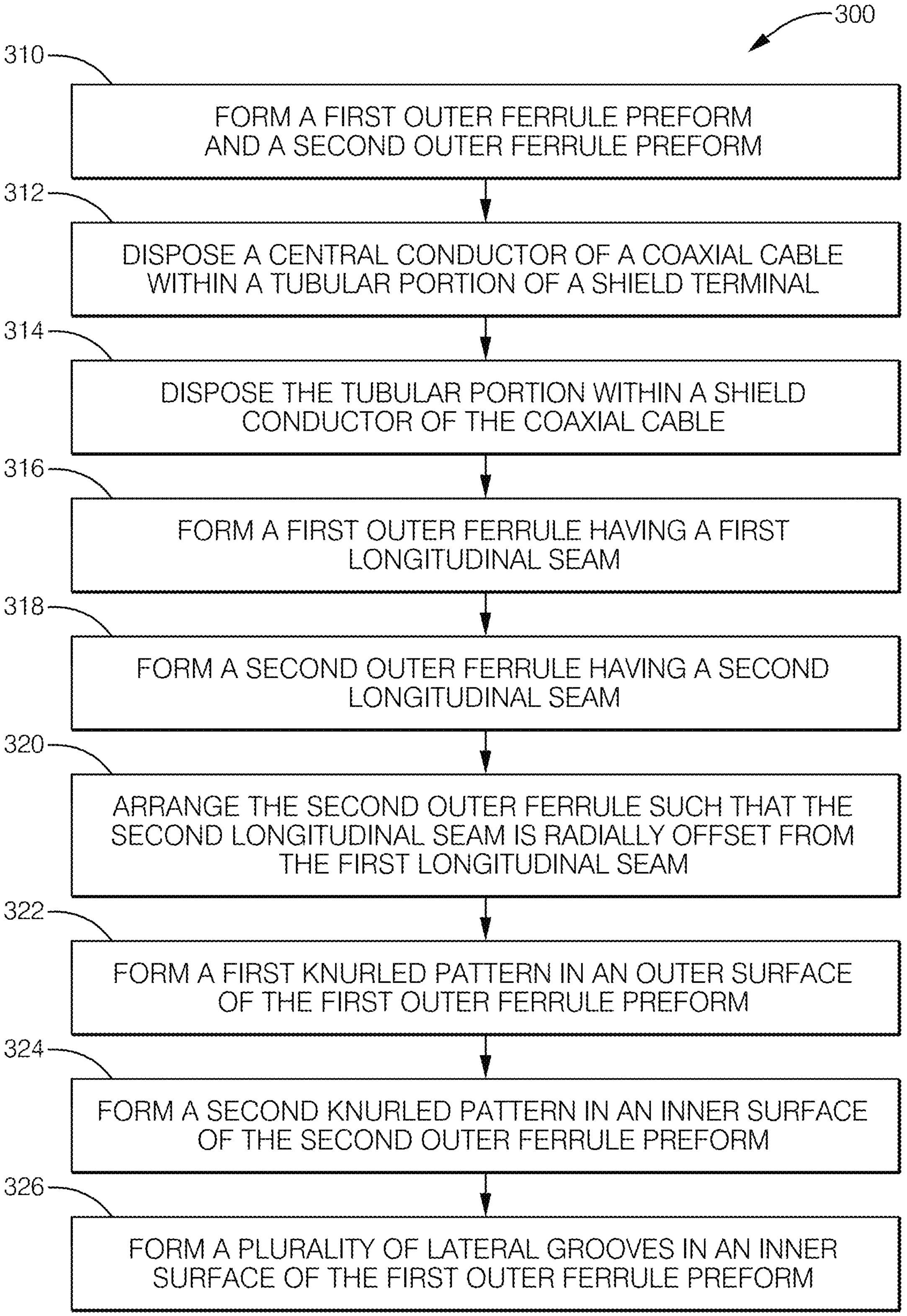
FIG. 14 is a flow chart of a method of assembling a coaxial electrical cable assembly according to some other embodiments.

A method 300 of assembling a coaxial electrical cable assembly 100, such as the one described above, is shown in FIG. 14. The method 300 includes the steps of:

STEP 310, FORM A FIRST OUTER FERRULE PREFORM AND A SECOND OUTER FERRULE PREFORM, includes forming a first outer ferrule preform 124 and a second outer ferrule preform 126 made from flat sheet metal;

STEP 312, DISPOSE A CENTRAL CONDUCTOR OF A COAXIAL CABLE WITHIN A TUBULAR PORTION OF A SHIELD TERMINAL, includes disposing a central conductor 102 of a coaxial cable 110 within a tubular end portion 116 of a shield terminal 114;

STEP 314, DISPOSE THE TUBULAR PORTION WITHIN A SHIELD CONDUCTOR OF THE COAXIAL CABLE, includes disposing the tubular end portion 116 within a shield conductor 106 of the coaxial cable 110;

STEP 316, FORM A FIRST OUTER FERRULE HAVING A FIRST SEAM, includes forming a first outer ferrule 120 having a first seam 134 by crimping the first outer ferrule preform 124 around the shield conductor 106. Due to the offset edges 130A, 130B and diagonal edges 130C of the first outer ferrule 120, the first seam has a shape that may be described as a Z shape, an S shape, or a serpentine shape. The first seam 134 may have first edge portions 130A longitudinally extending from an end of the first outer ferrule 120, second edge portions 130B longitudinally extending from an opposite end of the first outer ferrule 120 and radially offset from the first edge portions 130A, and third edge portions 130C extending diagonally across the first outer ferrule 120 from the first edge portions 130A to the second edge portions 130B. The first outer ferrule preform 124 is crimped over the tubular end portion 116 of the shield terminal 114. The first outer ferrule 120 is crimped such that the edges of the first seam 134 are separated. The first outer ferrule preform 124 may be formed from a first material and the second outer ferrule preform 126 may be formed from a second material different from the first material. The first material may be a stainless steel alloy and the second material may be a beryllium-copper alloy;

STEP 318, FORM A SECOND OUTER FERRULE HAVING A SECOND SEAM, includes forming a second outer ferrule 122 having a second seam 136 by crimping the second outer ferrule preform 126 around the first outer ferrule 120. The second outer ferrule preform 126 is crimped over the first outer ferrule 120 and an outer insulative jacket 108 of the coaxial cable 110. Crimping the second outer ferrule 122 around the first outer ferrule 120 draws the edges 130A, 130B, 130C of the first seam 134 together;

STEP 320, ARRANGE THE SECOND OUTER FERRULE SUCH THAT THE SECOND SEAM IS RADIALLY OFFSET FROM THE FIRST SEAM, includes arranging the second outer ferrule 122 such that the second seam 136 is radially offset from the first seam 134. STEP 320 is preferably performed prior to STEP 318. The second seam 136 is preferably radially offset from the first seam 134 by about 180 degrees;

STEP 322, FORM A KNURLED PATTERN IN AN OUTER SURFACE OF THE FIRST OUTER FERRULE PREFORM, includes forming a knurled pattern 140 in an outer surface 138 of the first outer ferrule preform 124. STEP 322 is preferably performed prior to STEP 316;

STEP 324, FORM A KNURLED PATTERN IN AN INNER SURFACE OF THE SECOND OUTER FERRULE PREFORM, includes forming a knurled pattern 140 in an inner surface 142 of the second outer ferrule preform 126. STEP 324 is preferably performed prior to STEP 318; and STEP 326, FORM A PLURALITY OF LATERAL GROOVES IN AN INNER SURFACE OF THE FIRST OUTER FERRULE PREFORM, includes forming a plurality of lateral grooves 146 in an inner surface 144 of the first outer ferrule preform 124. STEP 326 is preferably performed prior to STEP 316.

In some aspects, the techniques described herein relate to a coaxial electrical cable assembly, including: a central conductor disposed within a shield conductor of the coaxial cable; a shield terminal having a tubular portion, wherein the central conductor of the coaxial cable is disposed within the tubular portion and wherein the tubular portion is disposed within the shield conductor of the coaxial cable; a first outer ferrule crimped around the shield conductor of the coaxial cable forming a first seam; and a second outer ferrule crimped around the first outer ferrule and forming a second seam, wherein the first outer ferrule is arranged over the tubular portion of the shield terminal and the second outer ferrule is arranged over the first outer ferrule and an outer insulative jacket of the coaxial cable.

In some aspects, the techniques described herein relate to a coaxial electrical cable assembly, wherein the first seam has a first seam portion longitudinally extending from an end of the first outer ferrule, a second seam portion longitudinally extending from an opposite end of the first outer ferrule and radially offset from the first seam portion, and a third seam portion extending diagonally across the first outer ferrule from the first seam portion to the second seam portion.

In some aspects, the techniques described herein relate to a coaxial electrical cable assembly, wherein an outer surface of the first outer ferrule defines a knurled pattern.

In some aspects, the techniques described herein relate to a coaxial electrical cable assembly, wherein an inner surface of the second outer ferrule defines a knurled pattern.

In some aspects, the techniques described herein relate to a coaxial electrical cable assembly, wherein an inner surface of the first outer ferrule defines a plurality of lateral grooves.

In some aspects, the techniques described herein relate to a coaxial electrical cable assembly, wherein the first outer ferrule is formed from a first preform and the second outer ferrule is formed from a second preform different from the first preform.

In some aspects, the techniques described herein relate to a coaxial electrical cable assembly, wherein the first preform is formed of a stainless steel alloy and the second preform is formed of a beryllium-copper alloy.

In some aspects, the techniques described herein relate to a coaxial electrical cable assembly, wherein the first seam and the second seam are radially offset from one another.

In some aspects, the techniques described herein relate to a coaxial electrical cable assembly wherein the first seam and the second seam are radially offset from one another by about 180 degrees.

In some aspects, the techniques described herein relate to a coaxial electrical cable assembly, wherein the second seam defines rectangular alignment features.

In some aspects, the techniques described herein relate to a coaxial electrical cable assembly, wherein a first portion of the second outer ferrule arranged over the first outer ferrule has a smaller diameter than a second portion of the second outer ferrule arranged over the outer insulative jacket.

In some aspects, the techniques described herein relate to a method of assembling a coaxial electrical cable assembly, including: disposing a central conductor of a coaxial cable within a tubular portion of a shield terminal; disposing the tubular portion within a shield conductor of the coaxial cable; crimping a first outer ferrule having a first seam around the shield conductor, wherein the first outer ferrule is arranged over the tubular portion of the shield terminal; and crimping a second outer ferrule having a second seam around the first outer ferrule, wherein the second outer ferrule is arranged over the first outer ferrule and an outer insulative jacket of the coaxial cable.

In some aspects, the techniques described herein relate to a method, further including the steps of providing a first outer ferrule preform and a second outer ferrule preform and forming the first outer ferrule preform into the first outer ferrule and forming the second outer ferrule preform into the second outer ferrule.

In some aspects, the techniques described herein relate to a method, wherein the first seam has a first seam portion longitudinally extending from an end of the first outer ferrule, a second seam portion longitudinally extending from an opposite end of the first outer ferrule and radially offset from the first seam portion, and a third seam portion extending diagonally across the first outer ferrule from the first seam portion to the second seam portion.

In some aspects, the techniques described herein relate to a method, further including arranging the second outer ferrule such that the second seam is radially offset from the first seam.

In some aspects, the techniques described herein relate to a method, wherein the second outer ferrule preform is arranged such that the second seam is radially offset from the first seam by about 180 degrees.

In some aspects, the techniques described herein relate to a method, wherein the first outer ferrule preform is formed from a first material and the second outer ferrule preform is formed from a second material different from the first material.

In some aspects, the techniques described herein relate to a method, wherein the outer ferrule preform is formed of a stainless steel alloy and the second outer ferrule preform is formed of a beryllium-copper alloy.

In some aspects, the techniques described herein relate to a coaxial electrical cable assembly, including: a central conductor disposed within a shield conductor of the coaxial cable; a shield terminal having a tubular portion, wherein the central conductor of the coaxial cable is disposed within the tubular portion and wherein the tubular portion is disposed within the shield conductor of the coaxial cable; a first outer ferrule crimped around the shield conductor of the coaxial cable forming a first seam; and a second outer ferrule crimped around the first outer ferrule and forming a second seam, wherein an outer surface of the first outer ferrule defines a knurled pattern.

In some aspects, the techniques described herein relate to a coaxial electrical cable assembly, wherein an inner surface of the second outer ferrule defines a knurled pattern.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A coaxial electrical cable assembly, comprising:
- a central conductor disposed within a shield conductor of the coaxial cable;
- a shield terminal having a tubular portion, wherein the central conductor of the coaxial cable is disposed within the tubular portion and wherein the tubular portion is disposed within the shield conductor of the coaxial cable;
- a first outer ferrule crimped around the shield conductor of the coaxial cable forming a first seam; and
- a second outer ferrule crimped around the first outer ferrule and forming a second seam, wherein the first outer ferrule is arranged over the tubular portion of the shield terminal and the second outer ferrule is arranged over the first outer ferrule and an outer insulative jacket of the coaxial cable.

2. The coaxial electrical cable assembly according to claim 1, wherein the first seam has a first seam portion longitudinally extending from an end of the first outer ferrule, a second seam portion longitudinally extending from an opposite end of the first outer ferrule and radially offset from the first seam portion, and a third seam portion extending diagonally across the first outer ferrule from the first seam portion to the second seam portion.

3. The coaxial electrical cable assembly according to claim 1, wherein an outer surface of the first outer ferrule defines a knurled pattern.

4. The coaxial electrical cable assembly according to claim 1, wherein an inner surface of the second outer ferrule defines a knurled pattern.

5. The coaxial electrical cable assembly according to claim 1, wherein an inner surface of the first outer ferrule defines a plurality of lateral grooves.

6. The coaxial electrical cable assembly according to claim 1, wherein the first outer ferrule is formed from a first preform and the second outer ferrule is formed from a second preform different from the first preform.

7. The coaxial electrical cable assembly according to claim 6, wherein the first preform is formed of a stainless steel alloy and the second preform is formed of a beryllium-copper alloy.

8. The coaxial electrical cable assembly according to claim 1, wherein the first seam and the second seam are radially offset from one another.

9. The coaxial electrical cable assembly according to claim 8 wherein the first seam and the second seam are radially offset from one another by about 180 degrees.

10. The coaxial electrical cable assembly according to claim 1, wherein the second seam defines rectangular alignment features.

11. The coaxial electrical cable assembly according to claim 1, wherein a first portion of the second outer ferrule arranged over the first outer ferrule has a smaller diameter than a second portion of the second outer ferrule arranged over the outer insulative jacket.

12. A method of assembling a coaxial electrical cable assembly, comprising:
- disposing a central conductor of a coaxial cable within a tubular portion of a shield terminal;
- disposing the tubular portion within a shield conductor of the coaxial cable;
- crimping a first outer ferrule having a first seam around the shield conductor, wherein the first outer ferrule is arranged over the tubular portion of the shield terminal; and
- crimping a second outer ferrule having a second seam around the first outer ferrule, wherein the second outer ferrule is arranged over the first outer ferrule and an outer insulative jacket of the coaxial cable.

13. The method according to claim 12, further comprising:
- providing a first outer ferrule preform and a second outer ferrule preform; and
- forming the first outer ferrule preform into the first outer ferrule and forming the second outer ferrule preform into the second outer ferrule.

14. The method according to claim 12, wherein the first seam has a first seam portion longitudinally extending from an end of the first outer ferrule, a second seam portion longitudinally extending from an opposite end of the first outer ferrule and radially offset from the first seam portion, and a third seam portion extending diagonally across the first outer ferrule from the first seam portion to the second seam portion.

15. The method according to claim 12, further comprising arranging the second outer ferrule such that the second seam is radially offset from the first seam.

16. The method according to claim 15, wherein the second outer ferrule is arranged such that the second seam is radially offset from the first seam by about 180 degrees.

17. The method according to claim 12, wherein the first outer ferrule is formed from a first material and the second outer ferrule is formed from a second material different from the first material.

18. The method according to claim 17, wherein the first outer ferrule is formed of a stainless steel alloy and the second outer ferrule is formed of a beryllium-copper alloy.

19. A coaxial electrical cable assembly, comprising:

a central conductor disposed within a shield conductor of the coaxial cable;

a shield terminal having a tubular portion, wherein the central conductor of the coaxial cable is disposed within the tubular portion and wherein the tubular portion is disposed within the shield conductor of the coaxial cable;

a first outer ferrule crimped around the shield conductor of the coaxial cable forming a first seam; and a second outer ferrule crimped around the first outer ferrule and forming a second seam, wherein an outer surface of the first outer ferrule defines a knurled pattern and wherein the second seam is radially offset from the first seam by about 180 degrees.

20. The coaxial electrical cable assembly according to claim 19, wherein an inner surface of the second outer ferrule defines a knurled.

* * * * *